US010293727B2

(12) United States Patent
Tatewaki et al.

(10) Patent No.: US 10,293,727 B2
(45) Date of Patent: May 21, 2019

(54) HEADREST

(71) Applicant: TOYOTA BOSHOKU KABUSHIKI KAISHA, Aichi (JP)

(72) Inventors: Kenji Tatewaki, Aichi (JP); Tatsuyuki Morishita, Aichi (JP); Masatoshi Mori, Aichi (JP); Hiroki Toyoshima, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 9 days.

(21) Appl. No.: 15/596,107

(22) Filed: May 16, 2017

(65) Prior Publication Data

US 2017/0341546 A1    Nov. 30, 2017

(30) Foreign Application Priority Data

May 24, 2016 (JP) ................................. 2016-103501

(51) Int. Cl.
*B60N 2/865* (2018.01)

(52) U.S. Cl.
CPC .................................... *B60N 2/865* (2018.02)

(58) Field of Classification Search
None
See application file for complete search history.

(56) References Cited

U.S. PATENT DOCUMENTS

| 4,856,848 | A  | * | 8/1989  | O'Sullivan | B60N 2/865 297/391 |
| 4,944,554 | A  | * | 7/1990  | Gross | A47C 7/462 297/284.3 |
| 5,882,071 | A  | * | 3/1999  | Fohl | B60N 2/888 297/216.12 |
| 6,203,107 | B1 | * | 3/2001  | Jonsson | A47C 1/023 297/312 |
| 6,511,130 | B2 | * | 1/2003  | Dinkel | B60N 2/809 297/410 |
| 7,073,863 | B1 | * | 7/2006  | Low | B60N 2/865 297/404 |
| 7,631,932 | B2 | * | 12/2009 | Hoffmann | B60N 2/865 297/216.12 |
| 8,596,715 | B2 |   | 12/2013 | Yamaguchi et al. | |
| 8,714,650 | B2 | * | 5/2014  | Sobieski | B60N 2/865 297/391 |
| 9,085,253 | B2 | * | 7/2015  | Delling | B60N 2/865 |
| 9,950,652 | B2 | * | 4/2018  | Line | B60N 2/0232 |
| 2002/0024247 | A1 | * | 2/2002 | Mori | B60N 2/0224 297/391 |
| 2006/0103222 | A1 | * | 5/2006 | Caruso | A47C 1/03 297/452.15 |

(Continued)

FOREIGN PATENT DOCUMENTS

JP          2011-207306          10/2011

*Primary Examiner* — David E Allred
(74) *Attorney, Agent, or Firm* — Greenblum & Bernstein, P.L.C.

(57) ABSTRACT

A headrest in one aspect of the present disclosure comprises a first frame member, a second frame member, a displacement mechanism configured to displace the second frame member with respect to the first frame member, a first guide shaft, and a second guide shaft arranged at a position shifted in a substantially vertical direction and in a substantially horizontal direction with respect to the first guide shaft.

10 Claims, 10 Drawing Sheets

(56) References Cited

U.S. PATENT DOCUMENTS

| | | | |
|---|---|---|---|
| 2008/0005917 A1* | 1/2008 | Willette | A47C 7/462 33/561.1 |
| 2010/0127541 A1* | 5/2010 | Kotz | B60N 2/865 297/216.12 |
| 2010/0270841 A1* | 10/2010 | Sobieski | B60N 2/865 297/391 |
| 2015/0183347 A1* | 7/2015 | Falster | B60N 2/4805 297/410 |
| 2016/0144744 A1* | 5/2016 | Jeong | B60N 2/0232 297/283.1 |
| 2017/0120786 A1* | 5/2017 | Cao | B60N 2/80 |

* cited by examiner

HEADREST

CROSS-REFERENCE TO RELATED APPLICATIONS

This application claims the benefit of Japanese Patent Application No. 2016-103501 filed on May 24, 2016 with the Japan Patent Office, the disclosure of which is incorporated herein by reference.

BACKGROUND

The present disclosure relates to a headrest mounted to an upper end of a seatback.

For example, in a headrest described in Japanese Unexamined Patent Application Publication No. 2011-207306, a headrest movable portion is displaceable in a front-rear direction with respect to a headrest main body. The headrest main body is a portion supported by a seatback. The headrest movable portion is a portion to support a head of an occupant.

SUMMARY

The headrest movable portion is supported by the headrest main body in a displaceable state with respect to the headrest main body. It is, therefore, preferable in one aspect of the present disclosure to provide a headrest enabling improvement in supporting rigidity when supporting a headrest movable portion.

A headrest in one aspect of the present disclosure comprises: a headrest main body mounted to an upper end of a seatback to support a head of a seated person on a seat from a rear side; a headrest movable portion arranged forward of the headrest main body and relatively displaceable in a front-rear direction with respect to the headrest main body; a first frame member configuring the headrest main body; a second frame member configuring the headrest movable portion and being displaceable with respect to the first frame member; a displacement mechanism configured to displace the second frame member with respect to the first frame member; a first guide shaft fixed to a first selected one of the first frame member and the second frame member and extending in a direction substantially parallel to a displacement direction of the second frame member, the first guide shaft being configured to guide a second selected one of the first frame member and the second frame member so as to be displaced in the direction substantially parallel to the displacement direction; and a second guide shaft fixed to a third selected one of the first frame member and the second frame member and extending in a direction substantially parallel to the first guide shaft, the second guide shaft being configured to guide a fourth selected one of the first frame member and the second frame member so as to be displaced in the direction substantially parallel to the displacement direction.

The second guide shaft is arranged at a position shifted in a substantially vertical direction and in a substantially horizontal direction with respect to the first guide shaft in a state where the headrest main body is mounted to the seatback.

Consequently, according to the present disclosure, rotational displacement of the second frame member around the substantially vertical direction or the substantially horizontal direction is restricted by the first guide shaft and the second guide shaft. Accordingly, it is possible to obtain a headrest that enables improvement in supporting rigidity when supporting the headrest movable portion.

The present disclosure may employ a configuration as described below.

Specifically, the headrest further comprises: at least one third guide shaft fixed to a fifth selected one of the first frame member and the second frame member and extending in a direction substantially parallel to the first guide shaft, the at least one third guide shaft being configured to guide a sixth selected one of the first frame member and the second frame member so as to be displaced in the direction substantially parallel to the displacement direction.

In this case, the second frame member is supported by at least three guide shafts, and thus further improvement in supporting rigidity can be achieved. The at least one third guide shaft is preferably arranged at a position shifted in a substantially vertical direction and in a substantially horizontal direction with respect to at least one of the first guide shaft or the second guide shaft.

The displacement mechanism may comprise: a lead screw portion extending in a direction substantially parallel to the first guide shaft and having one end coupled to a seventh selected one of the first frame member and the second frame member; and a driving device fixed to an eighth selected one of the first frame member and the second frame member, and comprising a nut portion to be engaged with the lead screw portion.

In the aforementioned configuration, the lead screw portion is preferably located within an imaginary polygon formed by using the first guide shaft, the second guide shaft, and the at least one third guide shaft to define apexes of the imaginary polygon. This enables smooth displacement of the second frame member and also enables achievement of an improved supporting rigidity.

In the aforementioned configuration, the driving device is preferably arranged between the first frame member and the second frame member. This enables housing of the driving device in the headrest.

In a state where the headrest main body is mounted to the seatback, the first guide shaft, the second guide shaft, and the at least one third guide shaft may comprise: at least one upper guide shaft positioned above the lead screw portion in the substantially vertical direction; and at least one lower guide shaft positioned below the lead screw portion in the substantially vertical direction. The number of the at least one upper guide shaft may be equal to or greater than the number of the at least one lower guide shaft.

This enables enhancement in supporting rigidity on an upper side of the headrest in the substantially vertical direction; thus, if a downward force in the substantially vertical direction is applied on the headrest, it is possible to obtain a supporting rigidity to sufficiently resist the downward force.

The headrest may further comprise: a first bearing portion provided to the second selected one of the first frame member and the second frame member, a second bearing portion provided to the fourth selected one of the first frame member and the second frame member, and at least one third bearing portion provided to the sixth selected one of the first frame member and the second frame member, the first, second, and at least one third bearing portions each having a cylindrical shape allowing insertion therethrough of a corresponding one of the first guide shaft, the second guide shaft, and the at least one third guide shaft. The first, second, and at least one third bearing portions may comprise: at least one lower bearing portion each allowing insertion therethrough of a corresponding one of the at least one lower guide shaft; and at least one upper bearing portion each allowing insertion therethrough of a corresponding one of the at least one upper guide shaft. The at least one lower bearing portion may have an axial length greater than an axial length of the at least one upper bearing portion. This enables supporting of the at least one lower guide shaft over a wide area.

The at least one lower guide shaft may have an axial length greater than an axial length of the at least one upper guide shaft. This enables secure supporting of the at least one lower guide shaft over a wide area.

Of the first frame member and the second frame member, the first selected one and the second selected one are different from each other, the third selected one and the fourth selected one are different from each other, the fifth selected one and the sixth selected one are different from each other, and the seventh selected one and the eighth selected one are different from each other. Also, the first selected one, the third selected one, the fifth selected one, and the seventh selected one may be the same one or different ones.

BRIEF DESCRIPTION OF THE DRAWINGS

Some embodiments of the present disclosure will be described hereinafter by way of example with reference to the accompanying drawings, in which.

DETAILED DESCRIPTION OF THE PREFERRED EMBODIMENTS

Figure 1:
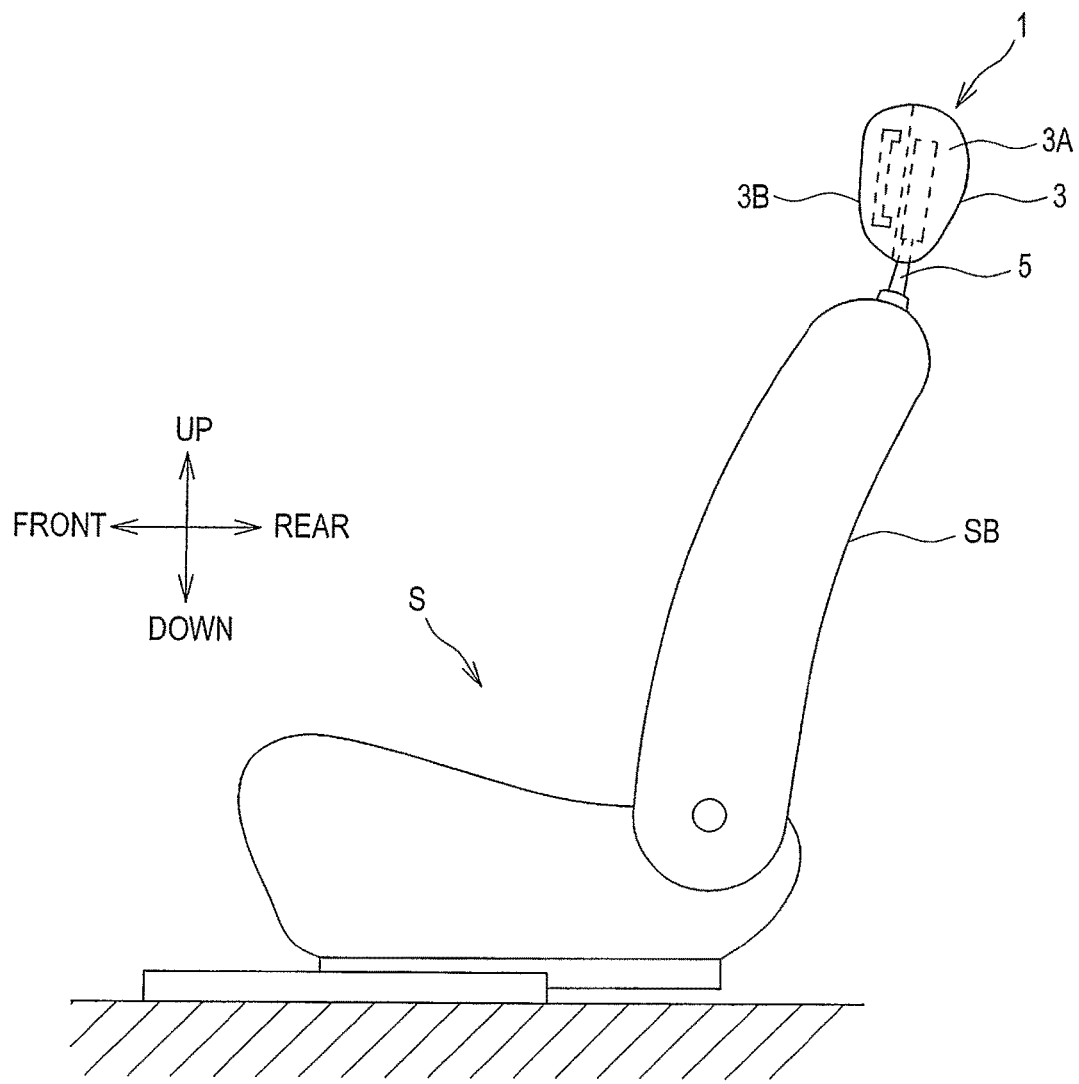
FIG. 1 is a view showing a state where a headrest according to an embodiment is mounted to a seatback.

Any "embodiment" described hereinafter is an example embodiment within the technical scope of the present disclosure. In other words, matters specifying the invention as defined in the accompanying claims are not limited to specific configurations, structures, or the like shown in the embodiments described hereinafter.

Arrows and the like indicating directions shown in the figures are intended to facilitate understanding of mutual relationships among the figures. The arrows and the like (directions) shown in the figures should not limit the scope of the present disclosure.

At least a member or a portion that is assigned a reference numeral and described is at least one in number, except when there is a mention of "a plurality of," "two or more," or the like.

First Embodiment

In the present embodiment, the present disclosure is applied to a headrest for a rear seat of a motor vehicle. As shown in FIG. 1, a headrest 1 according to the present embodiment is mounted to an upper end of a seatback SB in a substantially vertical direction. The seatback SB is a "backrest" of a seat S.

1. Overview of Headrest

The headrest 1 comprises a main body 3 and a stay 5. The main body 3 is a portion to contact a head of a seated person and directly support the head. The main body 3 comprises a cushion pad portion to absorb impact force and a cover portion covering the cushion pad portion.

The cushion pad portion comprises a member, such as foamed urethane, which absorbs impact force while being deformed. The cover portion, which is a member to directly contact the head, is formed of leather, synthetic leather, or the like.

The stay 5 couples the main body 3 to the seatback SB. That is, the stay 5 is one example of a mounting member to mount the headrest 1 to the seatback SB. The stay 5 according to the present embodiment couples the main body 3 so as to be displaceable in a substantially vertical direction with respect to the seatback SB.

Figure 2:
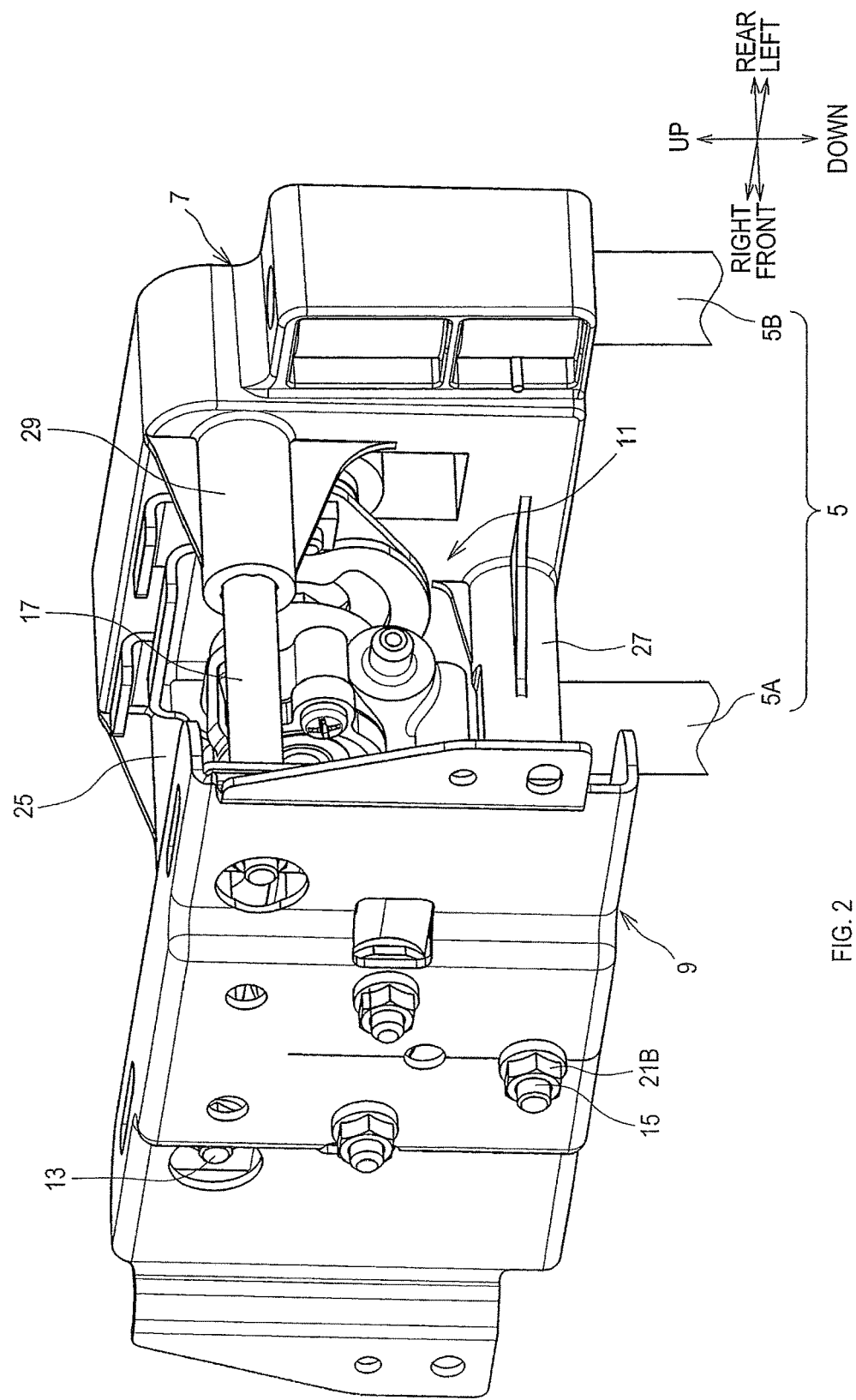
FIG. 2 is a perspective view showing a first frame member and a second frame member in a state where the second frame member is separate from the first frame member.

As shown in FIG. 2, the stay 5 comprises a pair of stay members 5A and 5B. The stay member 5A and the stay member 5B are located at different positions along a seat width direction in a state where the headrest 1 is mounted to the seatback SB. The seat width direction corresponds to a right-left direction of the vehicle.

Hereinafter, directions indicating positional relationships of respective components configuring the headrest 1 refer to directions in the state where the headrest 1 is mounted to the upper end of the seatback SB.

2. Configuration of Headrest Main Body 2.1 Schematic Configuration of Headrest Main Body As shown in FIG. 1, the main body 3 comprises a headrest main body 3A and a headrest movable portion 3B. The headrest main body 3A supports a head of a seated person on a seat from a rear side. The headrest main body 3A is coupled to the seatback SB through the stay 5.

The headrest movable portion 3B is arranged forward of the headrest main body 3A and is relatively displaceable in a front-rear direction with respect to the headrest main body 3A. That is, in the state where the headrest 1 is mounted to the seatback SB, the headrest movable portion 3B is located more forward in the vehicle than the headrest main body 3A.

Figure 3:
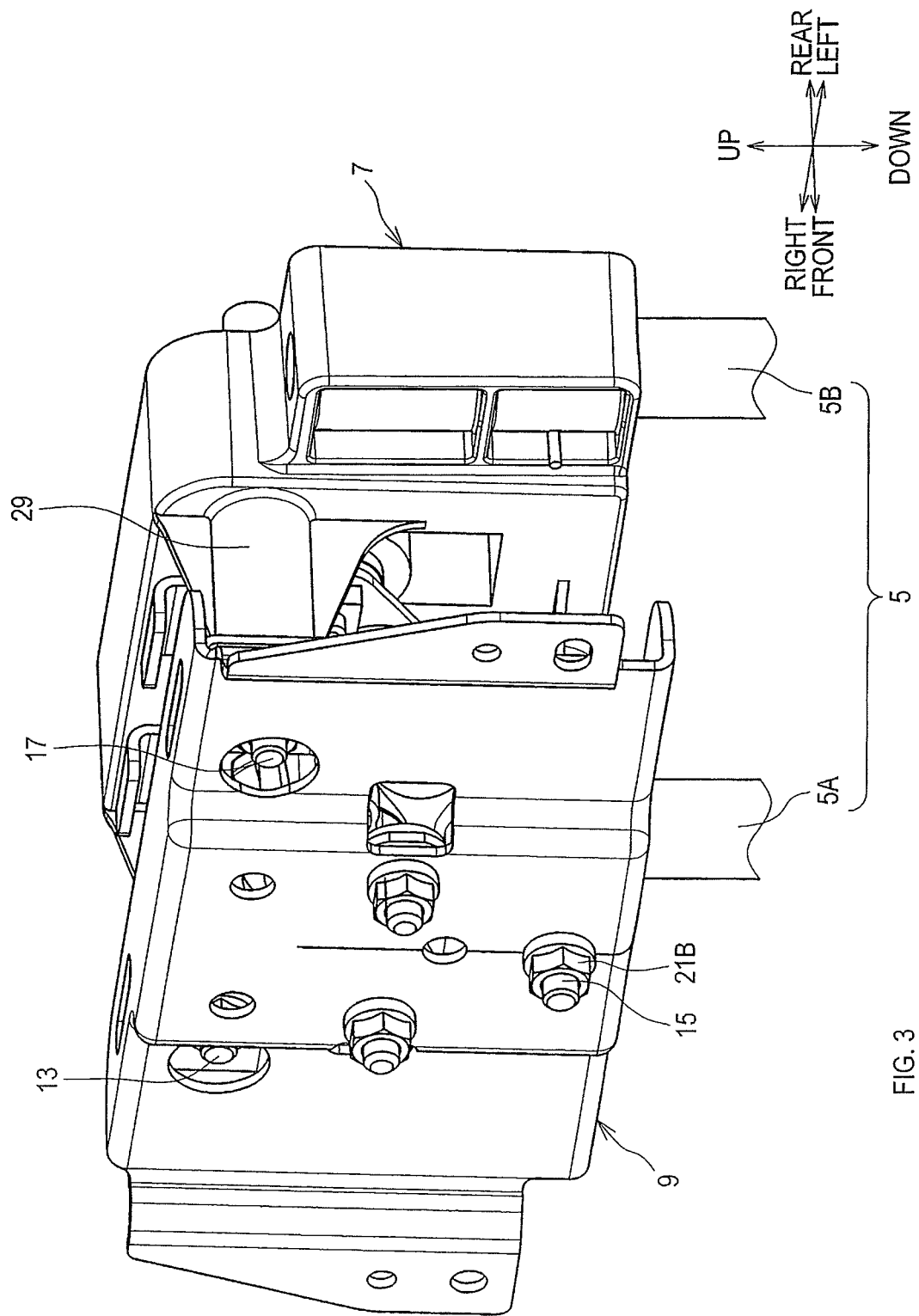
FIG. 3 is a perspective view showing the first frame member and the second frame member in a state where the second frame member is close to the first frame member.
Figure 4:
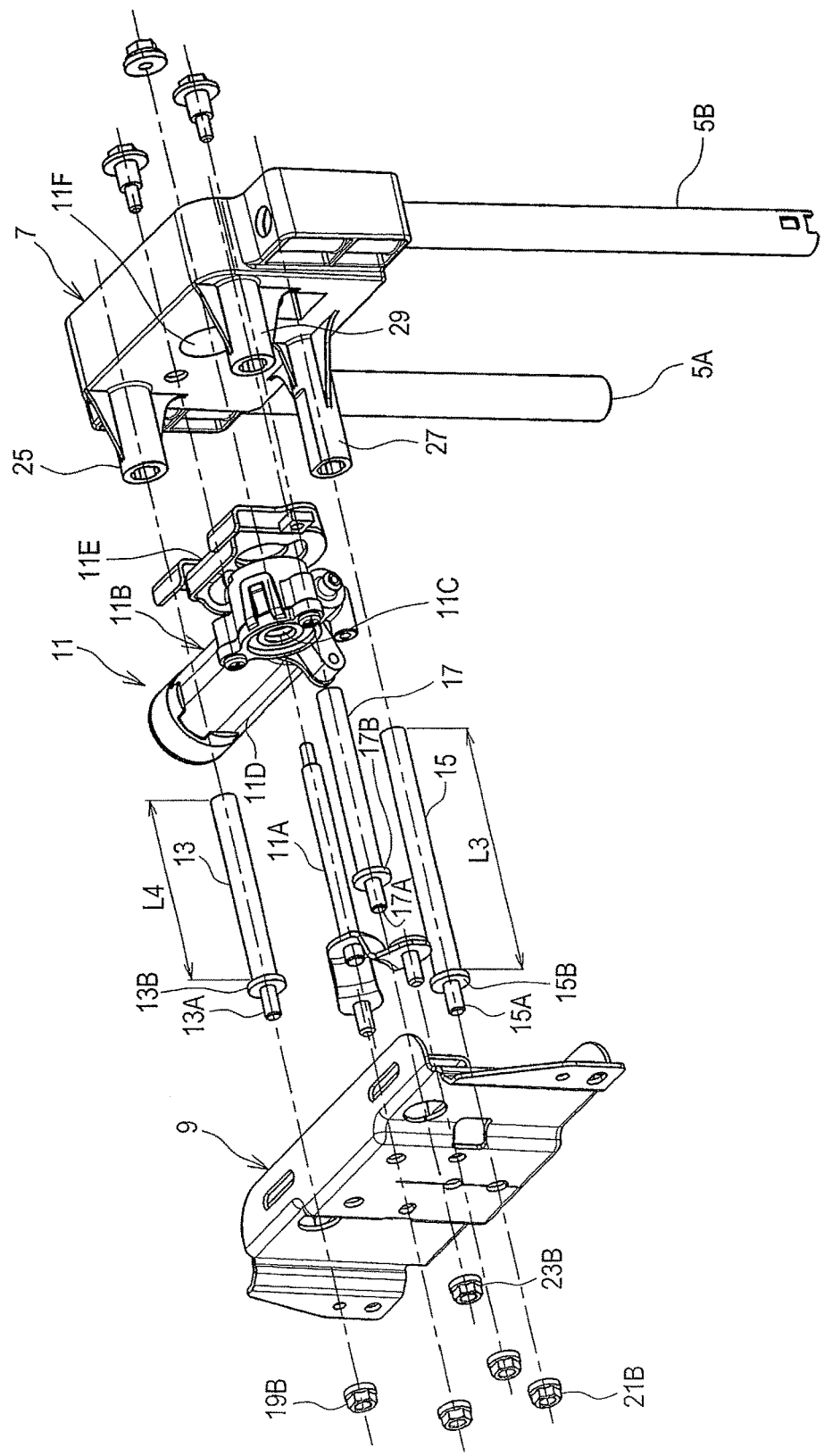
FIG. 4 is an exploded perspective view of the headrest according to the embodiment.

As shown in FIG. 2 to FIG. 4, the main body 3 houses a first frame member 7, a second frame member 9, and a displacement mechanism 11. The first frame member 7 is covered with foamed urethane, a cover, etc. to configure part of the headrest main body 3A.

The stay 5 is assembled to the first frame member 7. Accordingly, the first frame member 7, and thus the headrest main body 3A, is basically unmovable in a vehicle front-rear direction with respect to the seatback SB.

In the present embodiment, the stay 5 is tilted by a tilt angle from the substantially vertical direction; accordingly, when the headrest main body 3A, and thus the first frame member 7, is displaced along the substantially vertical direction, the first frame member 7 is displaced in the vehicle front-rear direction by a cosine component of the tilt angle.

The second frame member 9 is covered with foamed urethane, a cover, etc. to configure part of the headrest movable portion 3B. The second frame member 9 is displaceable in a separating/approaching direction with respect to the first frame member 7.

Specifically, the second frame member 9 is displaceable in the vehicle front-rear direction with respect to the first frame member 7 in the state where the headrest 1 is mounted to the seatback SB. That is, the headrest movable portion 3B is displaceable in a front-rear direction with respect to the headrest main body 3A.

FIG. 2 shows a state where the second frame member 9 is most separated forwardly from the first frame member 7. FIG. 3 shows a state where the second frame member 9 is closest to the first frame member 7.

The displacement mechanism 11 is a mechanism to displace the second frame member 9 with respect to the first frame member 7. The displacement mechanism 11 according to the present embodiment is an electrically driven displacement mechanism that is operated by a switching operation by a seated person or the like.

2.2 Supporting Structure of Second Frame Member (Headrest Movable Portion)

<Overview of Supporting Structure>

Figure 5:
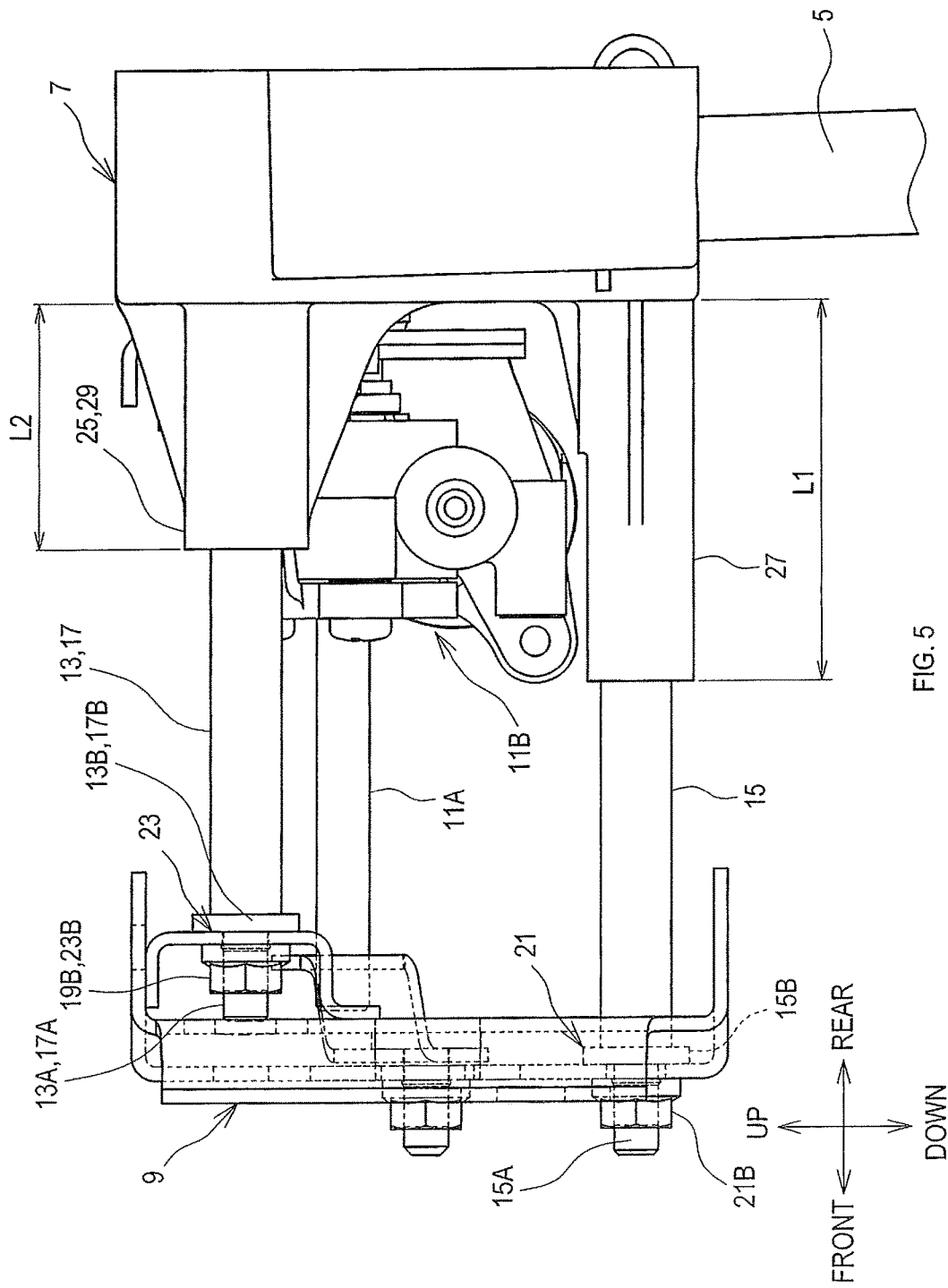
FIG. 5 is a side view of the first frame member and the second frame member in a state where the second frame member is separate from the first frame member.

As shown in FIG. 4 and FIG. 5, the second frame member 9 according to the present embodiment is supported by the first frame member 7 through a first guide shaft 13, a second guide shaft 15, and a third guide shaft 17. Hereinafter, the first guide shaft 13, the second guide shaft 15, and the third guide shaft 17 may also be collectively referred to as guide shafts 13, 15, 17.

Figure 6:
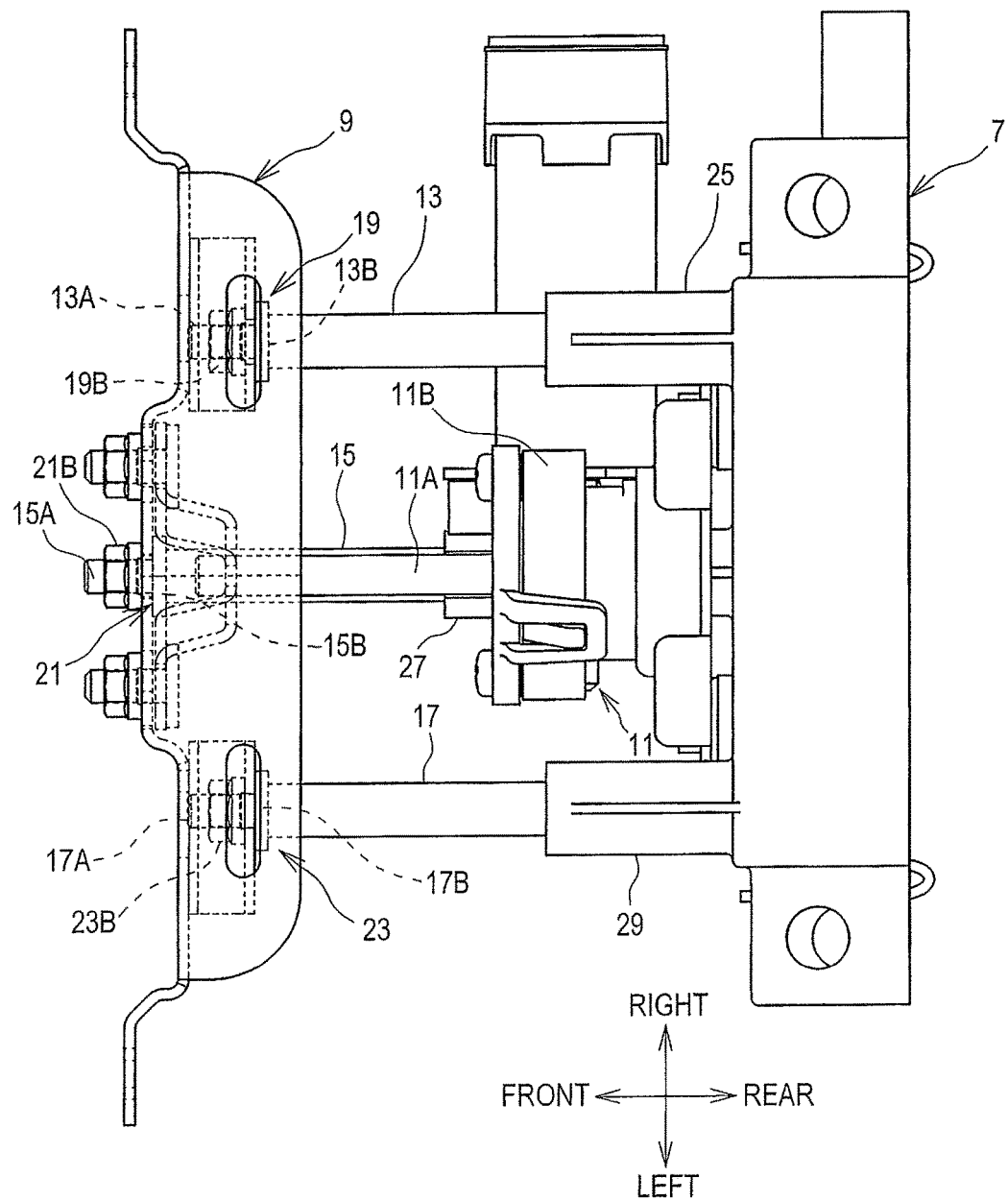
FIG. 6 is a top view of the first frame member and the second frame member.

Specifically, each of the guide shafts 13, 15, 17 is a rod-shaped member extending in a direction substantially parallel to a displacement direction of the second frame member 9. One end in an extending direction of each of the guide shafts 13, 15, 17 is fixed to the second frame member 9, as shown in FIG. 6.

Hereinafter, a fixing portion between the first guide shaft 13 and the second frame member 9 is referred to as a first fixing portion 19, a fixing portion between the second guide shaft 15 and the second frame member 9 is referred to as a second fixing portion 21, and a fixing portion between the third guide shaft 17 and the second frame member 9 is referred to as a third fixing portion 23.

The other end in the extending direction of the first guide shaft 13 is supported by a first bearing portion 25, the other end in the extending direction of the second guide shaft 15 is supported by a second bearing portion 27, and the other end in the extending direction of the third guide shaft 17 is supported by a third bearing portion 29. The first bearing portion 25, the second bearing portion 27, and the third bearing portion 29 are provided to the first frame member 7. The first guide shaft 13, the second guide shaft 15, and the third guide shaft 17 are respectively inserted through, and guidingly supported in a slidable manner by, the first bearing portion 25, the second bearing portion 27, and the third bearing portion 29.

Specifically, the first bearing portion 25 slidingly contacts an outer peripheral surface of the first guide shaft 13. The second bearing portion 27 slidingly contacts an outer peripheral surface of the second guide shaft 15. The third bearing portion 29 slidingly contacts an outer peripheral surface of the third guide shaft 17. Hereinafter, the first bearing portion 25, the second bearing portion 27, and the third bearing portion 29 may also be collectively referred to as bearing portions 25, 27, 29.

With the configuration as described above, the guide shafts 13, 15, 17 function as guide members to restrict the second frame member 9, when the second frame member 9 is displaced, from being displaced in a direction substantially perpendicular to the displacement direction. That is, the guide shafts 13, 15, 17 are guide members to reduce rattling in a substantially horizontal direction and a substantially vertical direction (in an upper-lower direction) and to inhibit turning around a horizontal axis and a vertical axis.

The guide shafts 13, 15, 17 according to the present embodiment are each a solid round metal rod. The bearing portions 25, 27, 29 each have a substantially cylindrical shape. The bearing portions 25, 27, 29 and the first frame member 7 are formed as a single piece made of resin. The second frame member 9 is formed by plastic working, such as press working, of a rolled steel sheet.

<Configuration of Displacement Mechanism>

As shown in FIG. 4 to FIG. 6, the displacement mechanism 11 comprises at least a lead screw portion 11A and a driving device 11B. As shown in FIG. 4, the lead screw portion 11A is a screw rod member that extends in a direction substantially parallel to the first guide shaft 13 and comprises one end coupled to the second frame member 9.

The driving device 11B is fixed to the second frame member 9 through a bracket 11E. The driving device 11B comprises a nut portion 11C to engage with the lead screw portion 11A, and turns the nut portion 11C in accordance with a switching operation by a seated person or the like.

Specifically, the driving device 11B is arranged between the first frame member 7 and the second frame member 9. The driving device 11B comprises an electric motor 11D and a gear mechanism (not shown) to transmit rotation of the electric motor 11D to the nut portion 11C.

The electric motor 11D rotates forwardly or reversely in accordance with the aforementioned switching operation. Accordingly, the second frame member 9, and thus the headrest movable portion 3B, is displaced in the vehicle front-rear direction in accordance with a switching operation by a seated person or the like. The first frame member 7 comprises a through hole 11F through which the lead screw portion 11A can pass.

<Arrangement of Guide Shafts and Other Components>

Figure 7A:
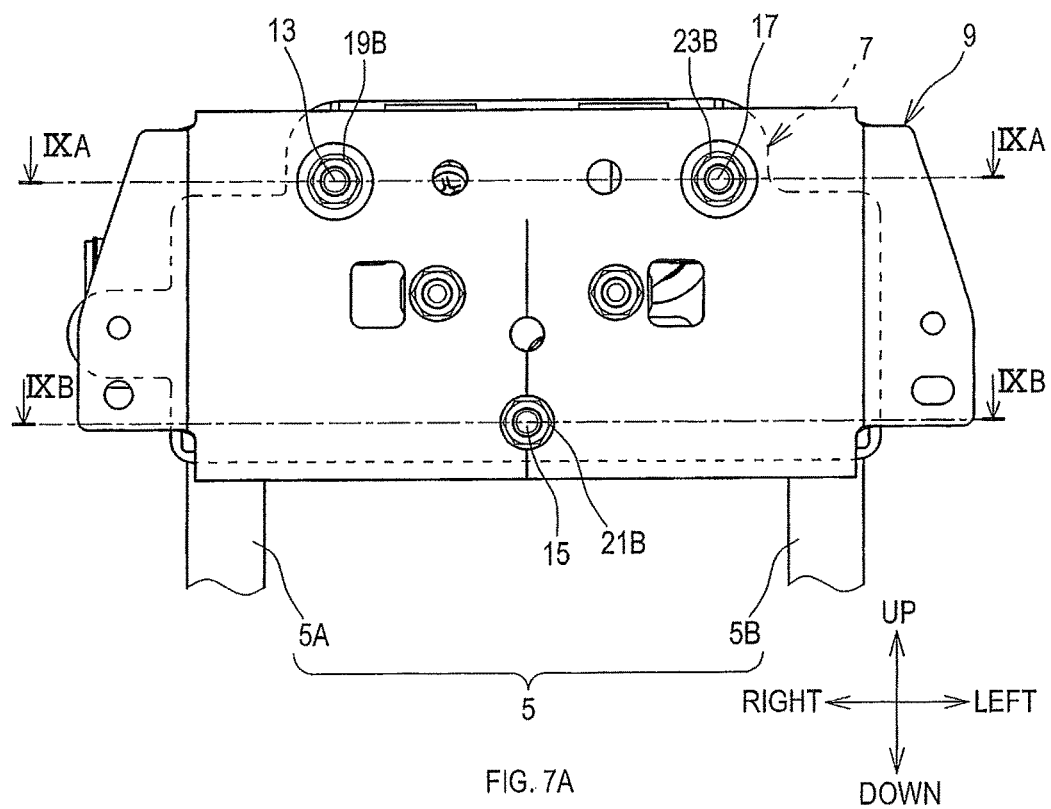
FIG. 7A is a front view of the headrest.
Figure 7B:
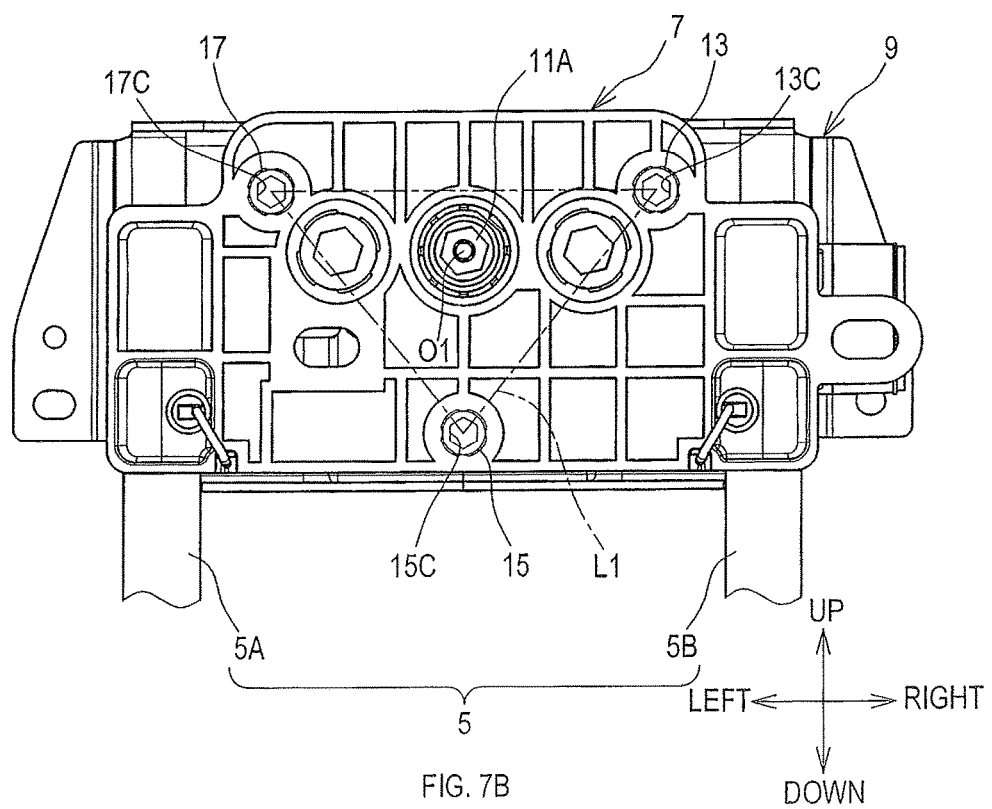
FIG. 7B is a rear view of the headrest.

As shown in FIG. 7A and FIG. 7B, the second guide shaft 15 is arranged at a position shifted in the substantially vertical direction and in the substantially horizontal direction with respect to the first guide shaft 13. Specifically, the second guide shaft 15 is arranged at a position shifted downward in the substantially vertical direction and leftward in the substantially horizontal direction with respect to the first guide shaft 13.

The third guide shaft 17 is arranged at a position shifted in the substantially horizontal direction with respect to the first guide shaft 13. Specifically, the third guide shaft 17 is arranged at a position shifted leftward in the substantially horizontal direction with respect to the first guide shaft 13.

In the present embodiment, a shift amount of the third guide shaft 17 in the substantially horizontal direction with respect to the first guide shaft 13 is greater than a shift amount of the second guide shaft 15 in the substantially horizontal direction with respect to the first guide shaft 13.

Thus, the third guide shaft 17 is arranged at a position shifted in the substantially vertical direction and in the substantially horizontal direction with respect to the second guide shaft 15. Specifically, the third guide shaft 17 is arranged at a position shifted upward in the substantially vertical direction and leftward in the substantially horizontal direction with respect to the second guide shaft 15.

In other words, an imaginary line L1 connecting a tip end of the first guide shaft 13, a tip end of the second guide shaft, and a tip end of the third guide shaft 17 forms a triangle as shown in FIG. 7B. In the present embodiment, a center axis O1 of the lead screw portion 11A is located within the aforementioned triangle.

Among the guide shafts 13, 15, 17, the number of guide shafts positioned above the lead screw portion 11A (hereinafter each referred to as an upper guide shaft) in the substantially vertical direction is greater than the number of guide shafts positioned below the lead screw portion 11A (hereinafter each referred to as a lower guide shaft) in the substantially vertical direction.

Specifically, the upper guide shafts according to the present embodiment are the first guide shaft 13 and the third guide shaft 17, whereas the lower guide shaft according to the present embodiment is the second guide shaft 15. That is, the number of the upper guide shafts is two, and the number of the lower guide shafts is one.

<Dimensions of Guide Shafts and Bearing Portions>

In the present embodiment, as shown in FIG. 5, an axial length L1 of the bearing portion slidingly contacting the lower guide shaft (hereinafter referred to as a lower bearing portion), among the bearing portions 25, 27, 29, is greater than an axial length L2 of the bearing portion slidingly contacting the upper guide shaft (hereinafter referred to as an upper bearing portion), among the bearing portions 25, 27, 29.

The lower bearing portion according to the present embodiment is the second bearing portion 27. The upper bearing portions according to the present embodiment are the first bearing portion 25 and the third bearing portion 29. The axial length of each of the bearing portions 25, 27, 29 is a dimension of a portion that slidingly contacts a corresponding one of the guide shafts 13, 15, 17 and is substantially parallel to the extending direction of the corresponding one of the guide shafts 13, 15, 17.

In the present embodiment, an axial length L3 of the lower guide shaft, that is, the second guide shaft 15 (see FIG. 4) is greater than an axial length L4 of the upper guide shafts, that is, the first guide shaft 13 and the third guide shaft 17 (see FIG. 4).

An axial length of each of the guide shafts 13, 15, 17 refers to a dimension of a portion that slidingly contacts a corresponding one of the bearing portions 25, 27, 29 and is substantially parallel to the extending direction of the corresponding one of the guide shafts 13, 15, 17. In the present embodiment, the axial length of the first bearing portion 25 and the axial length of the third bearing portion 29 are equal. The axial length of the first guide shaft 13 and the axial length of the third guide shaft 17 are equal.

<Fixing Structure Between Guide Shafts and Second Frame Member>

Figure 8:
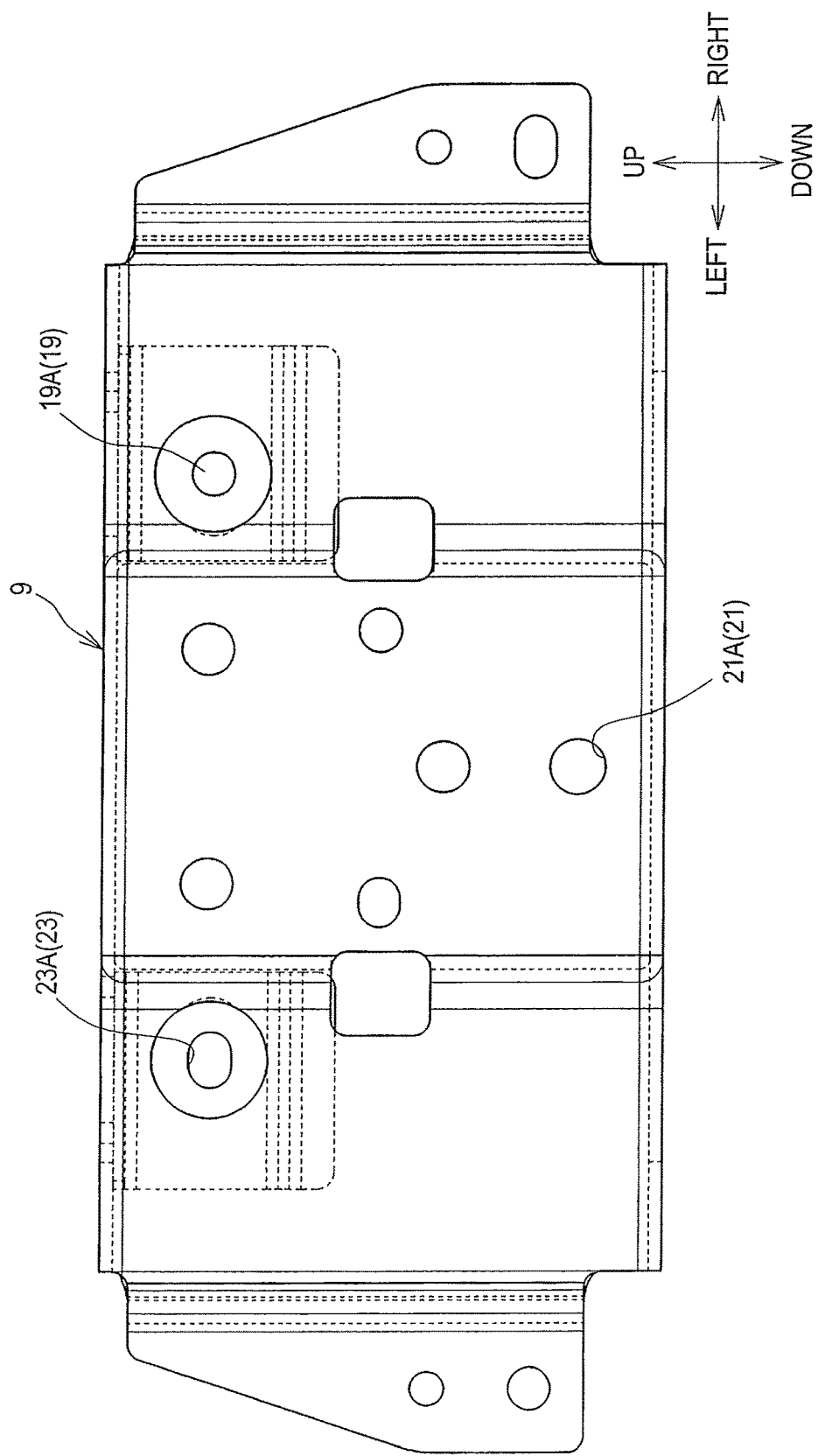
FIG. 8 is a front view of the second frame member.

As shown in FIG. 5 and FIG. 6, the guide shafts 13, 15, 17 are fixed to the second frame member 9 with the one end in the extending direction of each of the guide shafts 13, 15, 17 inserted into the second frame member 9. Specifically, as shown in FIG. 8, the first fixing portion 19, the second fixing portion 21, and the third fixing portion 23 respectively comprise a first insertion hole 19A, a second insertion hole 21A, and a third insertion hole 23A, into which the respective guide shafts 13, 15, 17 are inserted.

The one end in the extending direction of the first guide shaft 13 is inserted into the first insertion hole 19A from a first frame member 7 side. The one end in the extending direction of the second guide shaft 15 is inserted into the second insertion hole 21A from the first frame member 7 side.

The one end in the extending direction of the third guide shaft 17 is inserted into the third insertion hole 23A from the first frame member 7 side. As shown in FIG. 4, the one end in the extending direction of the first guide shaft 13 comprises a male screw portion 13A, the one end in the extending direction of the second guide shaft 15 comprises a male screw portion 15A, and the one end in the extending direction of the third guide shaft 17 comprises a male screw portion 17A.

Nuts 19B, 21B, 23B are respectively assembled to the male screw portions 13A, 15A, 17A, from a side opposite to the first frame member 7. Specifically, the nut 19B is one example of a first fastening member to fasten the first guide shaft 13 to the first fixing portion 19.

The nut 21B is one example of a second fastening member to fasten the second guide shaft 15 to the second fixing portion 21. The nut 23B is one example of a third fastening member to fasten the third guide shaft 17 to the third fixing portion 23.

The male screw portions 13A, 15A, 17A respectively comprise, on the first frame member 7 side thereof, stepped portions 13B, 15B, 17B having respective external dimensions greater than respective diameter dimensions of the male screw portions 13A, 15A, 17A. The male screw portions 13A, 15A, 17A each have a screw size "M5."

Accordingly, when the nuts 19B, 21B, 23B are assembled to the respective male screw portions 13A, 15A, 17A, the second frame member 9 is held by the nuts 19B, 21B, 23B and the respective stepped portions 13B, 15B, 17B.

In the present embodiment, collar-like flanges form the stepped portions 13B, 15B, 17B. Also, in the present embodiment, as shown in FIG. 6, the first fixing portion 19 and the third fixing portion 23 are provided at positions protruding toward the first frame member 7 as compared with the second fixing portion 21.

A maximum gap dimension between the second insertion hole 21A and the second guide shaft 15 is greater than a maximum gap dimension between the first insertion hole 19A and the first guide shaft 13. In other words, a gap dimension between the second insertion hole 21A and the male screw portion 15A is greater than a gap dimension between the first insertion hole 19A and the male screw portion 13A.

A maximum gap dimension between the third insertion hole 23A and the third guide shaft 17 is greater than the maximum gap dimension between the first insertion hole 19A and the first guide shaft 13. In other words, a gap dimension between the third insertion hole 23A and the male screw portion 17A is greater than the gap dimension between the first insertion hole 19A and the male screw portion 13A.

Specifically, the first insertion hole 19A has a round shape. The second insertion hole 21A has a round shape having an inner diameter dimension greater than that of the first insertion hole 19A. The third insertion hole 23A has an elongated hole shape having a long diameter direction in the substantially horizontal direction. The elongated hole shape here includes an oval shape and a spindle shape.

The long diameter dimension of the third insertion hole 23A is greater than the inner diameter dimension of the first insertion hole 19A, whereas a short diameter dimension of the third insertion hole 23A is equal to the inner diameter dimension of the first insertion hole 19A. In the present embodiment, the long diameter dimension of the third insertion hole 23A is equal to the inner diameter dimension of the second insertion hole 21A.

As shown in FIG. 7B, a rotation restricting portion 13C is provided at the other end in the extending direction of the first guide shaft 13, a rotation restricting portion 15C is provided at the other end in the extending direction of the second guide shaft 15, and a rotation restricting portion 17C is provided at the other end in the extending direction of the third guide shaft 17. The rotation restricting portions 13C, 15C, 17C are portions to restrict rotation of the respective guide shafts 13, 15, 17.

Figure 9A:
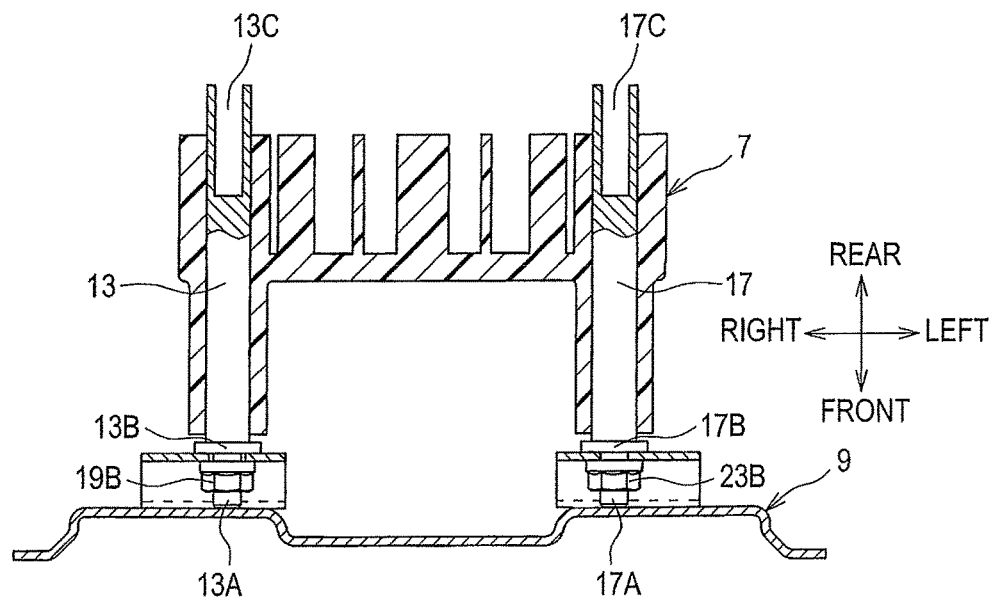
FIG. 9A is a sectional view taken along a line IXA-IXA of FIG. 7A.
Figure 9B:
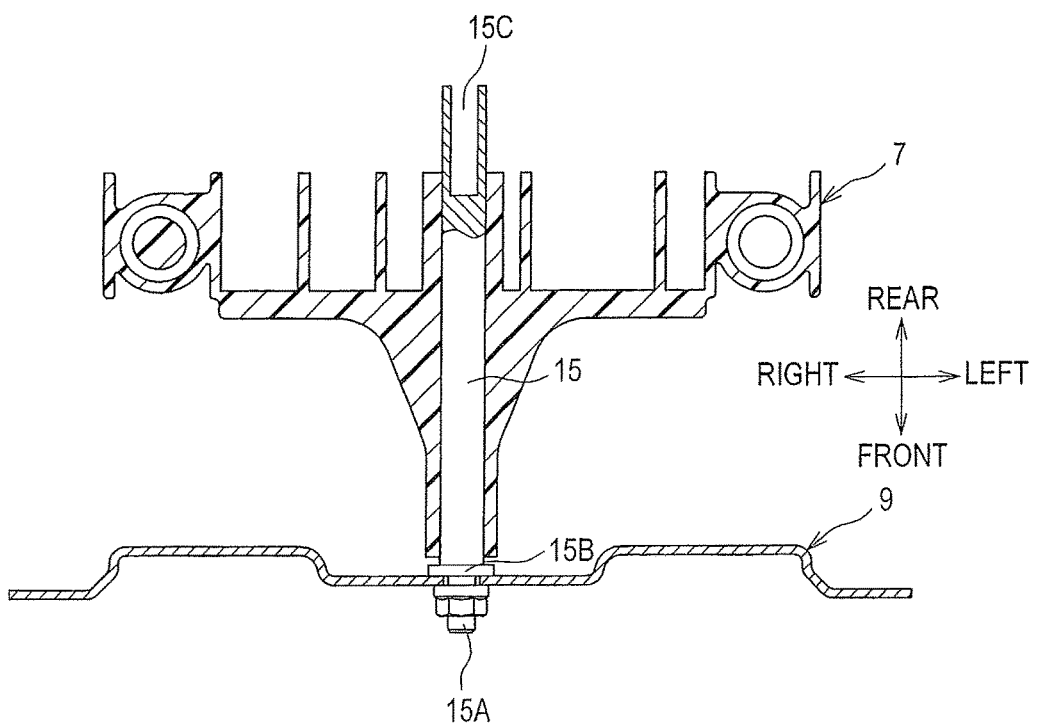
FIG. 9B is a sectional view taken along a line IXB-IXB of FIG. 7A.

Each of the rotation restricting portions 13C, 15C, 17C comprises at least two (six in the present embodiment) planar faces. As shown in FIG. 9A and FIG. 9B, the planar faces are provided in an inner peripheral surface of a hole depressed from the other end toward the one end in the extending direction of a corresponding one of the guide shafts 13, 15, 17.

Specifically, each of the rotation restricting portions 13C, 15C, 17C according to the present embodiment is a hexagonal hole depressed from the other end toward the one end in the extending direction of the corresponding one of the guide shafts 13, 15, 17. The hexagonal hole allows insertion of a hexagonal wrench or the like.

2.3 Manufacturing Method of Headrest

Figure 10:
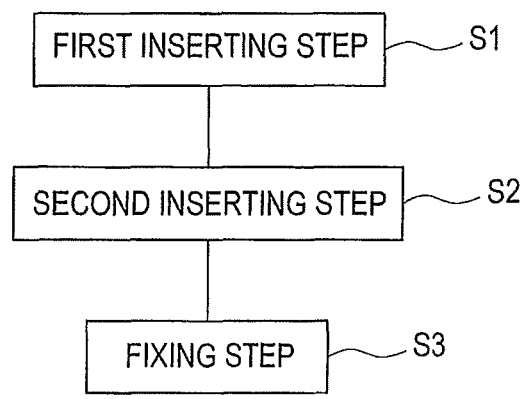
FIG. 10 is an assembly process diagram of the first frame member and the second frame member.

The first frame member 7, the second frame member 9, and the guide shafts 13, 15, 17 undergo manufacturing steps shown in FIG. 10. That is, a manufacturing method of a headrest comprises at least the manufacturing steps described below.

Specifically, in a first inserting step (S1), the guide shafts 13, 15, 17 are respectively inserted through the bearing portions 25, 27, 29.

In a second inserting step (S2) performed after completing the first inserting step (S1), the respective one ends in the extending direction of the guide shafts 13, 15, 17, that is, the male screw portions 13A, 15A, 17A, are respectively inserted into the first insertion hole 19A, the second insertion hole 21A, and the third insertion hole 23A.

In a fixing step (S3) performed after completing the second inserting step (S2), the guide shafts 13, 15, 17 are respectively fixed to the first fixing portion 19, the second fixing portion 21, and the third fixing portion 23. In other words, in the fixing step (S3), the nuts 19B, 21B, 23B are respectively assembled to the male screw portions 13A, 15A, 17A.

In the fixing step (S3), each of the nuts 19B, 21B, 23B is fastened with a hexagonal wrench or the like inserted into a corresponding one of the hexagonal holes configuring the rotation restricting portions 13C, 15C, 17C.

3. Features of Headrest According to Present Embodiment

In the present embodiment, the second guide shaft 15 is arranged at the position shifted in the substantially vertical direction and in the substantially horizontal direction with respect to the first guide shaft 13. As a result, the first guide shaft 13 and the second guide shaft 15 restrict rotational displacement of the second frame member 9 around the substantially vertical direction or the substantially horizontal direction.

Similarly, the third guide shaft 17 is arranged at the position shifted in the substantially vertical direction and in the substantially horizontal direction with respect to the second guide shaft 15. As a result, the second guide shaft 15 and the third guide shaft 17 restrict rotational displacement of the second frame member 9 around the substantially vertical direction or the substantially horizontal direction.

Thus, according to the present embodiment, it is possible to obtain the headrest 1 that can achieve an improved supporting rigidity when supporting the headrest movable portion 3B.

Since the second frame member 9 is supported by at least three guide shafts 13, 15, 17, improvement in supporting rigidity can be achieved as compared with, for example, a case of supporting the second frame member 9 only by the first guide shaft 13 and the second guide shaft 15.

The center axis of the lead screw portion 11A is located within the imaginary triangle formed by using the first guide shaft 13, the second guide shaft 15, and the third guide shaft 17 to define apexes of the imaginary triangle. This enables smooth displacement of the second frame member 9 and also enables achievement of an improved supporting rigidity. The center axis of the lead screw portion 11A may be arranged at a centroid (face-centered) position of the imaginary triangle.

The driving device 11B of the displacement mechanism 11 is arranged between the first frame member 7 and the second frame member 9. This enables housing of the driving device 11B within the headrest 1, and thus enables inhibition of upsizing of the headrest 1 in the front-rear direction.

The number of the guide shafts positioned above the lead screw portion 11A in the substantially vertical direction is equal to or greater than the number of the guide shafts positioned below the lead screw portion 11A in the substantially vertical direction.

This enables enhancement in supporting rigidity on an upper side of the headrest in the substantially vertical direction; thus, if a downward force in the substantially vertical direction is applied on the headrest 1, it is possible to obtain a supporting rigidity to sufficiently resist the downward force.

Also, the axial length L1 of the lower bearing portion 27 is greater than the axial length L2 of the upper bearing portions 25 and 29. This enables supporting, over a wide area, of the second guide shaft 15 positioned below the lead screw portion 11A in the substantially vertical direction.

Further, the axial length L3 of the lower guide shaft 15 is greater than the axial length L4 of the upper guide shafts 13 and 17. This enables secure supporting of the second guide shaft 15 over a wide area thereof.

In the present embodiment, the first, second, and third bearing portions 25, 27, 29 slidingly contacts the respective outer peripheral surfaces of the first, second, and third guide shafts 13, 15, 17. Accordingly, the guide shafts 13, 15, 17 are displaced while being guided in a sliding contact manner respectively by the first, second, and third bearing portions 25, 27, 29; thus, an improved supporting rigidity of the second frame member 9 can be achieved.

Meanwhile, the guide shafts 13, 15, 17 can be smoothly displaced without rattling as a gap between the first guide shaft 13 and the first bearing portion 25, a gap between the second guide shaft 15 and the second bearing portion 27, and a gap between the third guide shaft 17 and the third bearing portion 29 are reduced. This enables improvement in supporting rigidity of the second frame member 9.

However, if a relative positional deviation of the second bearing portion 27 with respect to the first bearing portion 25 is large, in a state where, for example, the first guide shaft 13 is inserted into the first insertion hole 19A and also the second guide shaft 15 is contacting the second bearing portion 27, an eccentric state may be caused in which a center axis of the second guide shaft 15 is deviated with respect to a center of the second insertion hole 21A and also a center axis of the third guide shaft 17 is deviated with respect to a center of the third insertion hole 23A.

In the aforementioned eccentric state, there may be the following problem: A contact surface pressure between the second guide shaft 15 and the second bearing portion 27, and a contact surface pressure between the third guide shaft 17 and the third insertion hole 23A become excessively large; thus, a resistance force when displacing the second guide shaft 15 and the third guide shaft 17 becomes large, and also early uneven wear occurs in the second guide shaft 15 and the second bearing portion 27 as well as in the third guide shaft 17 and the third insertion hole 23A.

Occurrence of the aforementioned problem may be reduced if, for example, the gap between the second guide shaft 15 and the second bearing portion 27, and the gap between the third guide shaft 17 and the third bearing portion 29 are increased.

However, the increased gaps will lead to an increase in rattling of the second guide shaft 15 and the third guide shaft 17, thereby making it difficult to smoothly displace the second guide shaft 15 and the third guide shaft 17. Thus, improvement in supporting rigidity of the second frame member 9 cannot be achieved.

In contrast, in the present embodiment, the maximum gap dimension between the second insertion hole 21A and the second guide shaft 15 is greater than the maximum gap dimension between the first insertion hole 19A and the first guide shaft 13, and also the maximum gap dimension between the third insertion hole 23A and the third guide shaft 17 is greater than the maximum gap dimension between the first insertion hole 19 and the first guide shaft 13.

Accordingly, even if an eccentric state is caused, such eccentricity can be absorbed. Thus, the headrest 1 according to the present embodiment enables improvement in supporting rigidity when supporting the headrest movable portion 3B.

The first insertion hole 19A has a round shape. The second insertion hole 21A has a round shape having the inner diameter dimension greater than that of the first insertion hole 19A. The third insertion hole 23A has an elongated hole shape having the long diameter direction in the substantially horizontal direction. Accordingly, even if an eccentric state is caused, such eccentricity can be absorbed.

The guide shafts 13, 15, 17 comprise the respective rotation restricting portions 13C, 15C, 17C to respectively restrict rotation of the guide shafts 13, 15, 17. This enables to restrict rotation of the guide shafts 13, 15, 17 together with the respective nuts 19B, 21B, 23B when the nuts 19B, 21B, 23B are rotated and fastened to the respective guide shafts 13, 15, 17.

The rotation restricting portions 13C, 15C, 17C each comprising a hexagonal hole can reduce hindrance of displacement of the respective guide shafts 13, 15, 17.

Specifically, the outer peripheral surfaces of the guide shafts 13, 15, 17 are portions that slidingly contact the respective bearing portions 25, 27, 29. Thus, if the rotation restricting portions 13C, 15C, 17C are provided to the respective outer peripheral surfaces of the guide shafts 13, 15, 17, displacement of the respective guide shafts 13, 15, 17 may be hindered.

However, each of the rotation restricting portions 13C, 15C, 17C according to the present embodiment is provided in the inner peripheral surface of the hole depressed from the other end toward the one end in the extending direction of the corresponding one of the guide shafts 13, 15, 17, and thus will not hinder displacement of the corresponding one of the guide shafts 13, 15, 17.

Other Embodiments

In the above-described embodiment, the three guide shafts 13, 15, 17 are provided. However, the present disclosure is not limited to the embodiment. Specifically, for example, two guide shafts, or four or more guide shafts may be provided.

In the above-described embodiment, among the three guide shafts 13, 15, 17, the first guide shaft 13 corresponds to one example of a first guide shaft in the present disclosure, the second guide shaft 15 corresponds to one example of a second guide shaft in the present disclosure, and the third guide shaft 17 corresponds to one example of a third guide shaft in the present disclosure.

However, the present disclosure is not limited to the embodiment. Specifically, for example, the third guide shaft 17 among the three guide shafts 13, 15, 17, may be configured as the first guide shaft in the present disclosure, or the third guide shaft 17 among the three guide shafts 13, 15, 17, may be configured as the second guide shaft in the present disclosure.

In the above-described embodiment, the one end in the extending direction of each of the guide shafts 13, 15, 17 is fixed to the second frame member 9, and the bearing portions 25, 27, 29 are provided to the first frame member 7. However, the present disclosure is not limited to the embodiment.

Specifically, for example, the guide shafts 13, 15, 17 may be fixed to the first frame member 7 and the bearing portions 25, 27, 29 may be provided to the second frame member 9. Also, the first frame member 7 and the second frame member 9 may be made of metal, or the first frame member 7 and the second frame member 9 may be made of resin.

In the above-described embodiment, the bearing portions 25, 27, 29 each have a substantially cylindrical shape, and the bearing portions 25, 27, 29 and the first frame member 7 are formed as a single piece made of resin. However, the present disclosure is not limited to the embodiment. Specifically, for example, the bearing portions 25, 27, 29 may be manufactured separately and then assembled with the first frame member 7.

In the above-described embodiment, the guide shafts 13, 15, 17 are each a solid round metal rod. However, the present disclosure is not limited to the embodiment. Specifically, for example, each of the guide shafts 13, 15, 17 may be configured using a square rod member, a square cylindrical member, or a round cylindrical member (or a round pipe).

The displacement mechanism 11 according to the above-described embodiment is an electrically driven displacement mechanism that is operated by a switching operation by a seated person or the like. However, the present disclosure is not limited to the embodiment. Specifically, for example, a configuration may be employed in which the driving device 11B is operated manually by an operation handle or an operation dial, or the driving device 11B operates automatically when an acceleration equal to or greater than a specified level acts on a vehicle or the like.

The displacement mechanism 11 according to the above-described embodiment displaces the second frame member 9 by rotation of the lead screw portion 11A. However, the present disclosure is not limited to the embodiment. Specifically, for example, the displacement mechanism 11 may be one using an X link mechanism.

The displacement mechanism 11 according to the above-described embodiment comprises the lead screw portion 11A having the one end in the extending direction fixed to the second frame member 9 and the other end comprising the driving device 11B that is fixed to the first frame member 7.

However, the present disclosure is not limited to the embodiment. Specifically, for example, a configuration may be employed in which the lead screw portion 11A has the one end in the extending direction fixed to the first frame member 7 and the other end comprising the driving device 11B that is fixed to the second frame member 9.

In the above-described embodiment, the driving device 11B is arranged between the first frame member 7 and the second frame member 9. However, the present disclosure is not limited to the embodiment. Specifically, for example, the driving device 11B may be arranged on an opposite side of the second frame member 9 with the first frame member 7 interposed therebetween, that is, arranged rearward of the first frame member 7.

The lead screw portion 11A according to the above-described embodiment is located within an imaginary polygon with apexes defined by the first guide shaft 13, the second guide shaft 15, and the third guide shaft 17. However, the present disclosure is not limited to the embodiment. Specifically, for example, the lead screw portion 11A may be located outside the imaginary polygon.

In the above-described embodiment, the number of the upper guide shafts is greater than the number of the lower guide shafts. However, the present disclosure is not limited to the embodiment. Specifically, for example, a configuration may be employed in which the number of the upper guide shafts and the number of the lower guide shafts are equal, or the number of the upper guide shafts is smaller than the number of the lower guide shafts.

In the above-described embodiment, the axial length L1 of the lower bearing portion is greater than the axial length L2 of the upper bearing portion. However, the present disclosure is not limited to the embodiment. Specifically, for example, a configuration may be employed in which the axial length L1 of the lower bearing portion and the axial length L2 of the upper bearing portion are equal, or the axial length L1 of the lower bearing portion is smaller than the axial length L2 of the upper bearing portion.

In the above-described embodiment, the axial length L3 of the lower guide shaft is greater than the axial length L4 of the upper guide shaft. However, the present disclosure is not limited to the embodiment.

Specifically, for example, a configuration may be employed in which the axial length L3 of the lower guide shaft and the axial length L4 of the upper guide shaft are equal, or the axial length L3 of the lower guide shaft is smaller than the axial length L4 of the upper guide shaft.

In the above-described embodiment, the first insertion hole 19A has a round shape, the second insertion hole 21A has a round shape having the inner diameter dimension greater than that of the first insertion hole 19A, and the third insertion hole 23A has an elongated hole shape having a long diameter direction in the substantially horizontal direction.

However, the present disclosure is not limited to the embodiment. Specifically, for example, all of the first, second, and third insertion holes 19A, 21A, 23A may have a round shape.

The guide shafts 13, 15, 17 according to the above-described embodiment are fixed to the second frame member 9 by fastening the respective nuts 19B, 21B, 23B to the respective male screw portions 13A, 15A, 17A.

However, the present disclosure is not limited to the embodiment. Specifically, for example, the guide shafts 13, 15, 17 may be caulking fixed by plastically deforming to crush the respective one ends in the extending directions in a state where the guide shafts 13, 15, 17 are inserted into the respective first, second, and third insertion holes 19A, 21A, 23A.

In the above-described embodiment, each of the rotation restricting portions 13C, 15C, 17C is configured using a hexagonal hole depressed from the other end toward the one end in the extending direction of a corresponding one of the guide shafts 13, 15, 17. However, the present disclosure is not limited to the embodiment.

Specifically, for example, a configuration may be employed in which the rotation restricting portions 13C, 15C, 17C are provided to the second frame member 9, in which any of the rotation restricting portions 13C, 15C, 17C is not provided, in which the outer peripheral surfaces of the guide shafts 13, 15, 17 each have a polygonal shape, or in which the outer peripheral surfaces each have a protrusion.

In the case of not providing the rotation restricting portions 13C, 15C, 17C, it is desirable to securely fasten the nuts 19B, 21B, 23B using an impact wrench or the like. In the case of providing the rotation restricting portion 13C, 15C, 17C to the second frame member 9, for example, an incomplete screw part of each of the male screw portions 13A, 15A, 17A may comprise width-across-flat parts, which serve as the corresponding one of the rotation restricting portions 13C, 15C, 17C.

In the above-described embodiment, the headrest 1 for a rear seat of a motor vehicle has been described. However, the present disclosure is not limited to the embodiment, and the features of the present disclosure may be applied to a front seat of a motor vehicle, a seat for a railway car, a seat for an airplane, and other seats.

Further, the present disclosure is not limited to the above-described embodiments, but may be in any form within the spirit of the present disclosure.

What is claimed is:

1. A headrest comprising:
   a headrest main body mounted to an upper end of a seatback to support a head of a seated person on a seat from a rear side;
   a headrest movable portion arranged forward of the headrest main body and relatively displaceable in a front-rear direction with respect to the headrest main body;
   a first frame member configuring the headrest main body;
   a second frame member configuring the headrest movable portion and being displaceable with respect to the first frame member;
   a displacement mechanism configured to displace the second frame member with respect to the first frame member;
   a first guide shaft fixed to one of the first frame member and the second frame member, and extending in a direction substantially parallel to a displacement direction of the second frame member, the first guide shaft being configured to guide another one of the first frame member and the second frame member so as to be displaced in the direction substantially parallel to the displacement direction; and a second guide shaft fixed to one of the first frame member and the second frame member and extending in a direction substantially parallel to the first guide shaft, the second guide shaft being configured to guide the other one of the first frame member and the second frame member so as to be displaced in the direction substantially parallel to the displacement direction, wherein the second guide shaft is arranged at a position shifted in a substantially vertical direction and in a substantially horizontal direction with respect to the first guide shaft in a state where the headrest main body is mounted to the seatback, wherein a stay member is attached to the first frame member, and wherein the displacement mechanism comprises:
a lead screw portion extending in a direction substantially parallel to the first guide shaft, a longitudinal direction of the lead screw portion being the front-rear direction, the lead screw portion having one end coupled to one of the first frame member and the second frame member; and a driving device fixed to the other one of the first frame member and the second frame member, and comprising a nut portion to be engaged with the lead screw portion, wherein the entire driving device is arranged forward of the first frame member.

2. The headrest according to claim 1, further comprising at least one third guide shaft fixed to one of the first frame member and the second frame member and extending in a direction substantially parallel to the first guide shaft, the at least one third guide shaft being configured to guide the other one of the first frame member and the second frame member so as to be displaced in the direction substantially parallel to the displacement direction.

3. The headrest according to claim 2, wherein the at least one third guide shaft is arranged at a position shifted in a substantially vertical direction and in a substantially horizontal direction with respect to at least one of the first guide shaft or the second guide shaft in a state where the headrest main body is mounted to the seatback.

4. The headrest according to claim 2,
wherein the lead screw portion is located within an imaginary polygon formed by using the first guide shaft, the second guide shaft, and the at least one third guide shaft to define apexes of the imaginary polygon.

5. The headrest according to claim 1, wherein the driving device is arranged between the first frame member and the second frame member.

6. The headrest according to claim 2, wherein, in a state where the headrest main body is mounted to the seatback, the first guide shaft, the second guide shaft, and the at least one third guide shaft comprise:
at least one upper guide shaft positioned above the lead screw portion in the substantially vertical direction; and
at least one lower guide shaft positioned below the lead screw portion in the substantially vertical direction,
wherein the number of the at least one upper guide shaft is equal to or greater than the number of the at least one lower guide shaft.

7. The headrest according to claim 6, further comprising:
a first bearing portion provided to one of the first frame member and the second frame member, a second bearing portion provided to the other one of the first frame member and the second frame member, and at least one third bearing portion provided to one of the first frame member and the second frame member, the first, second, and at least one third bearing portions each having a cylindrical shape allowing insertion therethrough of a corresponding one of the first guide shaft, the second guide shaft, and the at least one third guide shaft, and the first, second, and at least one third bearing portions comprising:
at least one lower bearing portion each allowing insertion therethrough of a corresponding one of the at least one lower guide shaft; and
at least one upper bearing portion each allowing insertion therethrough of a corresponding one of the at least one upper guide shaft,
wherein the at least one lower bearing portion has an axial length greater than an axial length of the at least one upper bearing portion.

8. The headrest according to claim 6, wherein the at least one lower guide shaft has an axial length greater than an axial length of the at least one upper guide shaft.

9. A headrest comprising:
a headrest main body mounted to an upper end of a seatback to support a head of a seated person on a seat from a rear side;
a headrest movable portion arranged forward of the headrest main body and relatively displaceable in a front-rear direction with respect to the headrest main body;
a first frame member configuring the headrest main body;
a second frame member configuring the headrest movable portion and being displaceable with respect to the first frame member;
a displacement mechanism configured to displace the second frame member with respect to the first frame member;
a first guide shaft fixed to one of the first frame member and the second frame member, and extending in a direction substantially parallel to a displacement direction of the second frame member, the first guide shaft being configured to guide another one of the first frame member and the second frame member so as to be displaced in the direction substantially parallel to the displacement direction; and
a second guide shaft fixed to one of the first frame member and the second frame member and extending in a direction substantially parallel to the first guide shaft, the second guide shaft being configured to guide the other one of the first frame member and the second frame member so as to be displaced in the direction substantially parallel to the displacement direction,
wherein the second guide shaft is arranged at a position shifted in a substantially vertical direction and in a substantially horizontal direction with respect to the first guide shaft in a state where the headrest main body is mounted to the seatback,
wherein the first guide shaft and the second guide shaft are able to protrude outside the first frame member, and
wherein the displacement mechanism comprises:
a lead screw portion extending in a direction substantially parallel to the first guide shaft, a longitudinal direction of the lead screw portion being the front-rear direction, the lead screw portion having one end coupled to one of the first frame member and the second frame member; and a driving device fixed to the other one of the first frame member and the second frame member, and comprising a nut portion to be engaged with the lead screw portion, wherein the entire driving device is arranged forward of the first frame member.

10. A headrest comprising:

a headrest main body mounted to an upper end of a seatback to support a head of a seated person on a seat from a rear side;

a headrest movable portion arranged forward of the headrest main body and relatively displaceable in a front-rear direction with respect to the headrest main body;

a first frame member configuring the headrest main body;

a second frame member configuring the headrest movable portion and being displaceable with respect to the first frame member;

a displacement mechanism configured to displace the second frame member with respect to the first frame member;

a first guide shaft fixed to one of the first frame member and the second frame member, and extending in a direction substantially parallel to a displacement direction of the second frame member, the first guide shaft being configured to guide another one of the first frame member and the second frame member so as to be displaced in the direction substantially parallel to the displacement direction; and a second guide shaft fixed to one of the first frame member and the second frame member and extending in a direction substantially parallel to the first guide shaft, the second guide shaft being configured to guide the other one of the first frame member and the second frame member so as to be displaced in the direction substantially parallel to the displacement direction, wherein the second guide shaft is arranged at a position shifted in a substantially vertical direction and in a substantially horizontal direction with respect to the first guide shaft in a state where the headrest main body is mounted to the seatback, and wherein the displacement mechanism comprises:

a lead screw portion extending in a direction substantially parallel to the first guide shaft, a longitudinal direction of the lead screw portion being the front-rear direction, the lead screw portion having one end coupled to one of the first frame member and the second frame member; and a driving device fixed to the other one of the first frame member and the second frame member, and comprising a nut portion to be engaged with the lead screw portion, wherein the lead screw portion is located within an imaginary polygon formed by using the first guide shaft, the second guide shaft, and the at least one third guide shaft to define apexes of the imaginary polygon, and wherein the entire driving device is arranged forward of the first frame member.

* * * * *